Patented Mar. 30, 1937

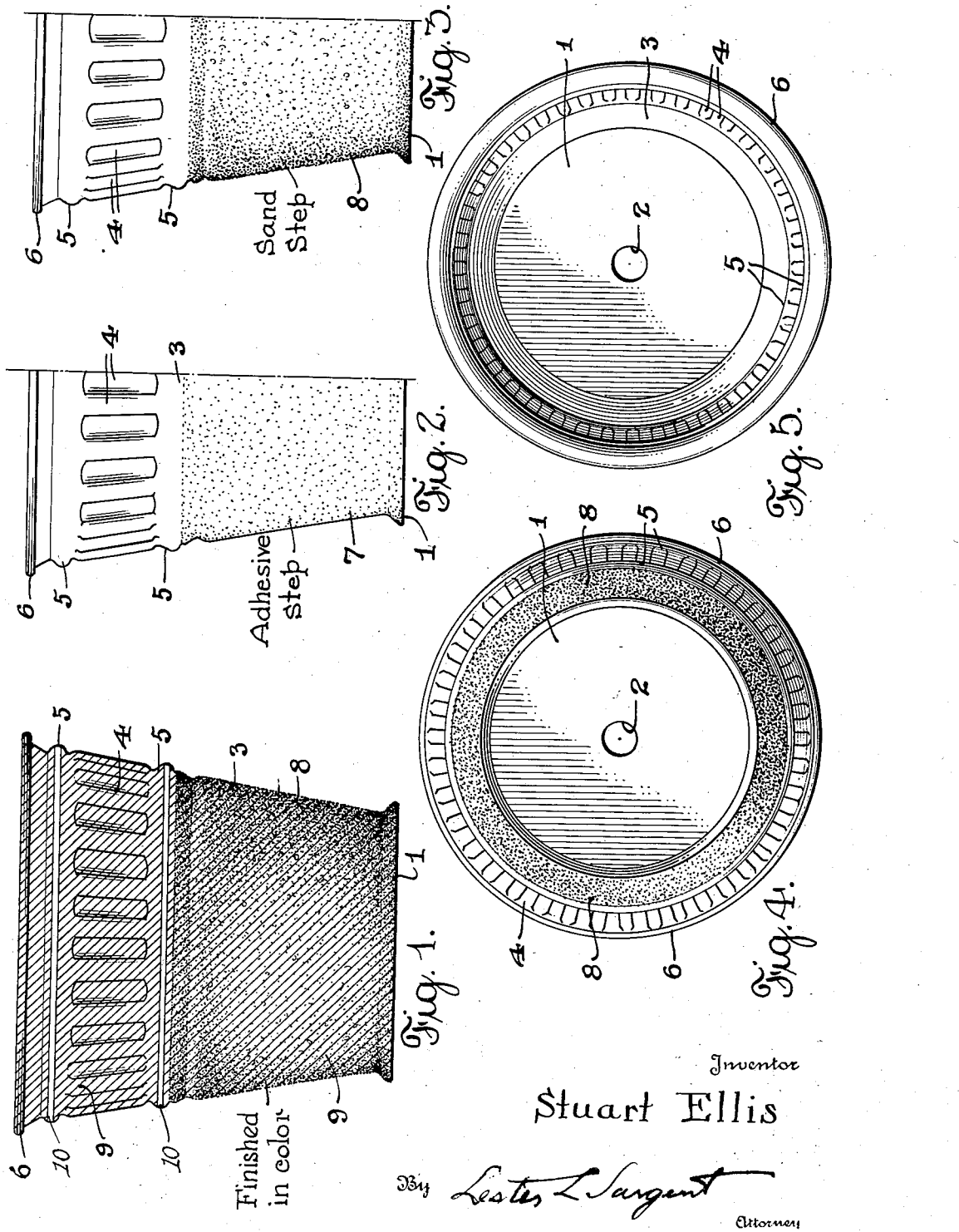

2,075,186

UNITED STATES PATENT OFFICE 2,075,186

METAL FLOWERPOT AND METHOD OF DECORATING SAME

Stuart Ellis, Fredericksburg, Va.

Application May 2, 1936, Serial No. 77,621

4 Claims. (Cl. 47—34)

The object of my invention is to provide a novel ornamental flower pot; and to provide a novel method of decorating a metal flower pot with sand and ornamentally coloring same and causing the sand to permanently adhere to the flower pot, and to provide a process of effecting such decoration of a metal flower pot at a minimum expense. I attain these and other objects of my invention in the manner hereinafter described and illustrated in the accompanying drawing, in which—

Figure 1 is a side elevation of the flower pot in its finished condition;

Fig. 2 is a side elevation of a portion of the flower pot showing the first step of applying an adhesive;

Fig. 3 is a similar view of a portion of the flower pot illustrating the second step of applying same;

Fig. 4 is a bottom plan view of the flower pot; and

Fig. 5 is a top plan view of the flower pot.

Like numerals designate like parts in each of the several views.

Referring to the accompanying drawing; there is illustrated a flower pot having a bottom 1 and aperture 2 in the bottom of the flower pot for the admission of water from the ribbed tray (not shown) on which the flower pot is seated. It also has sides 3 with spaced crimped portions 4 which both ornament and reinforce the flower pot, annular molding 5 and a rolled edge 6 which also both ornaments and reinforces the flower pot.

In carrying out my process the flower pot is first painted in any suitable manner with a colorless paint or varnish. An adhesive is then applied to the outside of the flower pot which it is desired to ornament with sand. Sand is then sprayed on the portion of the flower pot that carries the adhesive, and a layer of it sticks to the flower pot. The entire flower pot, including the sanded portion, is painted the desired color. After this coat of solid color paint has dried, the desired additional ornamental stripes 10 are painted on the flower pot.

In carrying out my process the flower pot may be placed on a roller and turned while a paint brush is held against the sides and an adhesive paint applied. Sand is allowed to drop on the painted portion of the flower pot or can be blown on in any suitable manner. On hitting the wet paint, which functions as an adhesive, the sand will stick and the operator continues to turn the flower pot until the sand is evenly distributed. All the loose sand falls off. The final coat of paint which covers the sand and which functions both as an ornamentation and as a binder for the sand, may be of any desired color.

It will also be noted that my flower pot has vertically extending crimps 4, annular spaced moldings 5 above and below the crimps 4, and a rolled edge 6. Each of these elements functions both as an ornamental feature and also as a reinforcing element, which considerably strengthens the flower pot.

What I claim is:—

1. The method of decorating a flower pot consisting in applying an adhesive such as a colorless paint to a portion of the outside surface of the flower pot, covering said painted portion with sand and allowing the paint to dry, and painting the sanded surface of the flower pot the desired color to decorate the flower pot and to also cause the sand to securely adhere to it.

2. As a new article of manufacture, a metal flower pot having a portion only of its outside surface covered successively with a layer of adhesive, a layer of ordinary sand, and a layer of paint of the desired color, whereby to decorate the flower pot and also to bind the sand securely in place so that it will not brush off.

3. As a new article of manufacture, a flower pot having its outside surface covered successively with a layer of adhesive, a layer of ordinary sand, and a layer of paint of the desired color whereby to decorate the flower pot and also to bind the sand securely in place so that it will not brush off.

4. As a new article of manufacture, a metal flower pot having spaced annular molding, vertically extending spaced crimps positioned between the annular molded portions, and having a rolled upper edge, the lower outside surface of the flower pot being covered with an adhesive and a layer of sand, said sanded portions also being painted the desired color whereby to decorate the flower pot and also to reinforce it throughout, substantially as described.

STUART ELLIS.